(12) United States Patent
Chiou et al.

(10) Patent No.: US 6,501,582 B2
(45) Date of Patent: Dec. 31, 2002

(54) CASCADED LINE-OF SIGHT FREE-SPACE COMMUNICATIONS SYSTEM

(75) Inventors: Peter Chiou, Potomac, MD (US); Scott Rafe, Poolesville, MD (US)

(73) Assignee: Digital Atlantic, Inc., Leesburg, VA (US)

(*) Notice: Subject to any disclaimer, the term of this patent is extended or adjusted under 35 U.S.C. 154(b) by 0 days.

(21) Appl. No.: 09/997,308

(22) Filed: Nov. 30, 2001

(65) Prior Publication Data

US 2002/0114044 A1 Aug. 22, 2002

Related U.S. Application Data

(60) Provisional application No. 60/270,200, filed on Feb. 22, 2001.

(51) Int. Cl.[7] .............................................. H04B 10/00
(52) U.S. Cl. ..................................................... 359/172
(58) Field of Search ................................. 359/172, 174, 359/176

(56) References Cited

U.S. PATENT DOCUMENTS

| | | | | |
|---|---|---|---|---|
| 5,289,306 A | * | 2/1994 | Hirohashi et al. | 359/174 |
| 5,563,728 A | * | 10/1996 | Allen et al. | 359/172 |
| 5,910,851 A | * | 6/1999 | Flaherty | 359/110 |

* cited by examiner

*Primary Examiner*—Jason Chan
*Assistant Examiner*—Dalzid Singh
(74) *Attorney, Agent, or Firm*—Arent Fox Kintner Plotkin & Kahn, PLLC (57) ABSTRACT

A cascaded line-of-sight wireless communications system operating in free-space. The system provides broadband access for subscribers, allowing high speed wireless data communication across cities or towns. The system has a free-space optical network that includes at least two optical repeater block devices for receiving, amplifying, and re-transmitting optical signals, and a gateway device coupled to one of the optical repeater block devices. The system is modularly constructed in a cascaded manner to efficiently and wirelessly relay data signals across the system. Particularly, the broadband access is unaffected even in the presence of natural or men-made impediments.

13 Claims, 11 Drawing Sheets

CASCADED LINE-OF SIGHT FREE-SPACE COMMUNICATIONS SYSTEM

CROSS REFERENCES TO RELATED APPLICATION

This application is related to, and claims the benefit of the earlier filing date of, U.S. Provisional Patent Application Ser. No. 60/270,200, filed Feb. 22, 2001, entitled "Cascaded Line of Sight Free-Space Communication System," the entirety of which is incorporated herein by reference.

BACKGROUND OF THE INVENTION

I. Field of the Invention

The present invention relates in general to wireless communication systems, and in particular, to a communication employing free-space optical networks.

II. Description of the Related Art

One of the biggest challenges in telecommunication system deployment is to maximize the speed and bandwidth of data communication to the greatest number of destinations. Each communication technology has its own advantages and disadvantages. In some cases, a combination of communication technologies is necessary to provide communication services to a variety of users.

Wired communication systems have the reliability, but are costly to deploy, and in some geographic regions, impossible to deploy. Fiber-optic communication systems, which are a special higher-speed, variety of a wired communication system, are attractive, but again are very costly to deploy in some areas. Radio frequency communication, on the other hand, does not require as much physical structure for deployment as a wired communication system, but is less reliable due to interference and fading conditions in certain geographic areas. Free-space optical communication has recently been investigated as an alternative to wired and wireless communication technologies. However, a cost effective and reliable free-space optical communication system is not heretofore known.

It is desirable to provide a communication system, and components therefore, that is cost effective and flexible to deploy, and capable of providing high bandwidth/data rate communication to any type of destination.

SUMMARY OF THE INVENTION

Briefly, according to one aspect of the invention, a communication system is provided that includes a free-space optical network. The free-space optical network comprises at least two optical repeater devices coupled to each other and at least one gateway device coupled to one of the optical repeater devices. The optical repeater devices have at least two optical ports and each detects an incoming free-space optical signal at one optical port and retransmits an outgoing free-space optical signal the same or the other optical port. The gateway device comprises an optical interface unit that interfaces free-space optical signals of the free-space optical network with electrical signals.

According to another aspect of the invention, there are several versions of optical repeater devices. The type of optical repeater device chosen depends on where in the optical network it is positioned, and the functions required at that point in the network. A basic version of the optical repeater device comprises two optical repeater circuits coupled between the two ports. Each optical repeater circuit detects, amplifies and retransmits an optical signal. A more advanced version of the optical repeater device employs phase adjustment of a detected signal prior to retransmission. Still a further advanced version of an optical repeater device comprises optical interface units (as opposed to the more simple optical repeater circuits) and a packet switch to enable media access control (MAC) layer addressing of data packets.

In deployment of the communication system, a plurality of optical repeater devices are cascaded throughout an area to relay optical signals across distances where they will be accessed. An access device is positioned in the optical network where it is desired to distribute data from the optical network to other networks or devices, and collect data from other networks or devices to be transmitted on the optical network. The access device is essentially an enhanced version of the most advanced optical repeater device, whereby a packet switch in the access device is used to interface data between the optical network and other networks or devices that are coupled to access ports on the packet switch.

The communication system of the present invention is very cost effective and flexible. At any point in the optical network, a gateway device can be deployed to gain access to the optical network. Moreover, when it is desirable to branch off the optical network to several other networks (electrical, optical, radio frequency, etc.) or devices, an access device is deployed. The communication system can interface with any other network or device using suitable interfaces between a generic electrical signal format (to and from which the optical signals of the optical network are converted) and the physical media type of another network or device.

An optional feature of the more basic versions of the optical repeater device is the provision of a switch between the optical repeater circuits to loop back an electrical signal in the event a photo detector in one of the optical repeater circuits become inoperative. This prevents termination of the signal, and allows for re-routing through another path in the network so that the data can reach its destination(s).

Still another aspect of the invention is an optical lens system useful at an optical port of an optical repeater device. The optical lens system comprises an incoming lens assembly for receiving and focusing a plurality incoming optical beams and an outgoing lens assembly. The incoming lens assembly and the outgoing lens assembly are designed to cooperate with each other as between optical repeater devices that communicate with each other. The incoming lens assembly comprises a main object lens and one or more additional lenses and a photo detector to detect light focused by the incoming lens assembly and generate at least one electrical signal representative thereof. The outgoing lens assembly generates the multiple optical beams that are received by the incoming lens assembly on another optical repeater device. The outgoing lens assembly comprises a beam splitter to split an outgoing optical beam into a plurality of identical beams, a plurality of photo detectors each for detecting one of the plurality of identical beams and generating an electrical signal representative thereof, a plurality of amplifiers each associated with a photo detector in the outgoing lens assembly to amplify the electrical signal output by a photo detector, a plurality of driver circuits each associated with an amplifier to generate a drive signal for each amplified electrical signal, a plurality of light emitters each associated with an amplifier to generate an optical beam based on the drive signal, and a plurality of object lens each associated with a light emitter to focus an optical beam radiated thereby for free-space transmission.

The objects and advantages of the present invention will become more readily apparent when reference is made to the following description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EXEMPLARY EMBODIMENTS

The exemplary embodiments of the present invention and their advantages are better understood by referring to FIGS. 1–10, like reference numerals being used to designate like or corresponding parts of the accompanying drawings.

Figure 1:
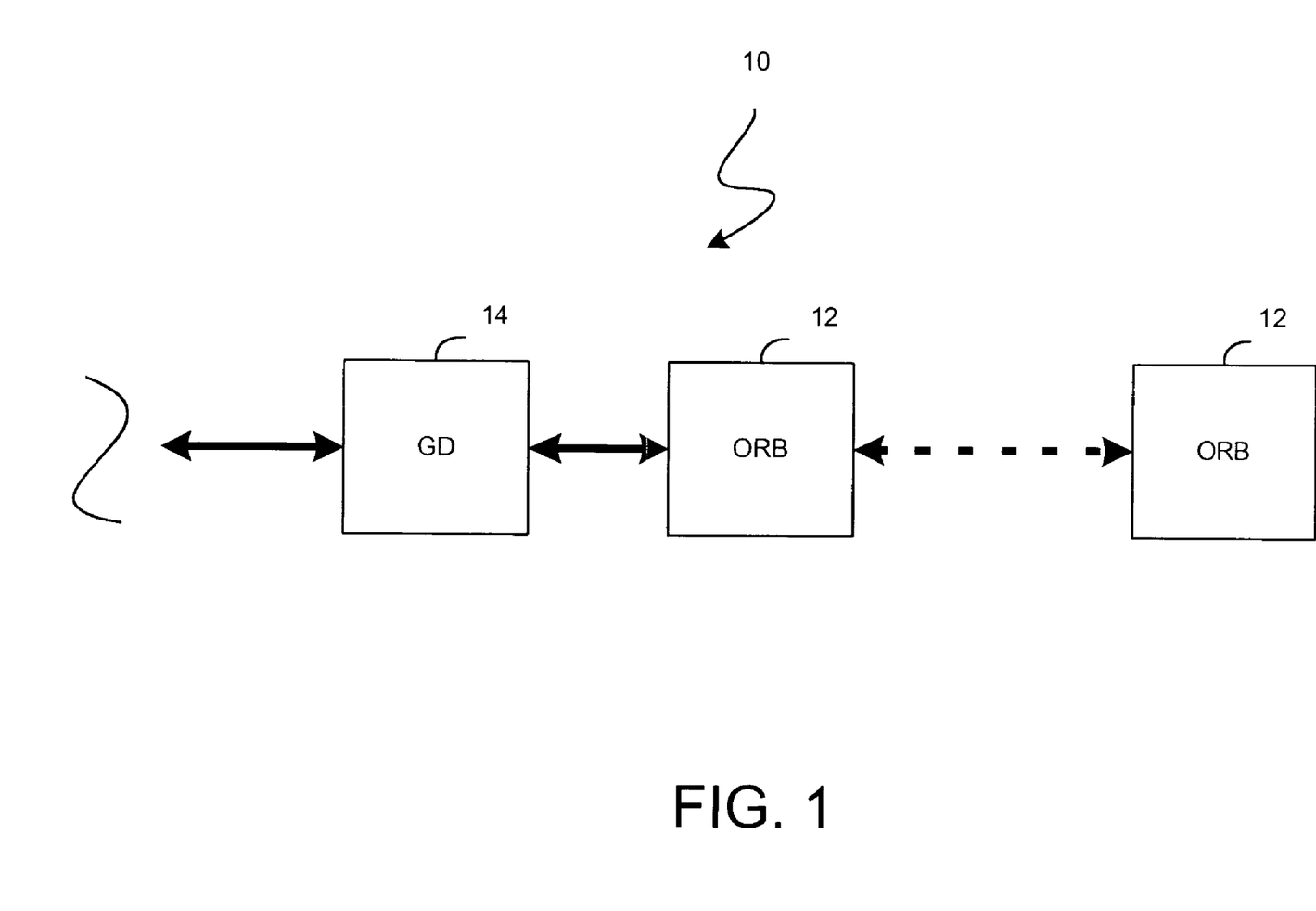
FIG. 1 shows a basic free-space optical communication system according to the present invention.

FIG. 1 illustrates a basic optical communications system 10 according to the present invention for wirelessly transmitting and relaying optical signals across a free-space optical network. Particularly, two or more optical repeater block (ORB) devices 12 coupled to each other in a cascaded fashion form an optical network. Each ORB device has least at two or more optical ports, and detects the incoming free-space optical signal at one optical port and retransmits an outgoing free-space optical signal at same or the other optical port.

By placing a corresponding Gateway Device (GD) 14 in direct line-of-sight to the ORB devices, data can be introduced and retrieved from other conventional wired or wireless networks. One or more additional ORB devices can also be added between the ORB devices 12 as indicated by the broken-line bidirectional arrow in FIG. 1.

Figure 2:
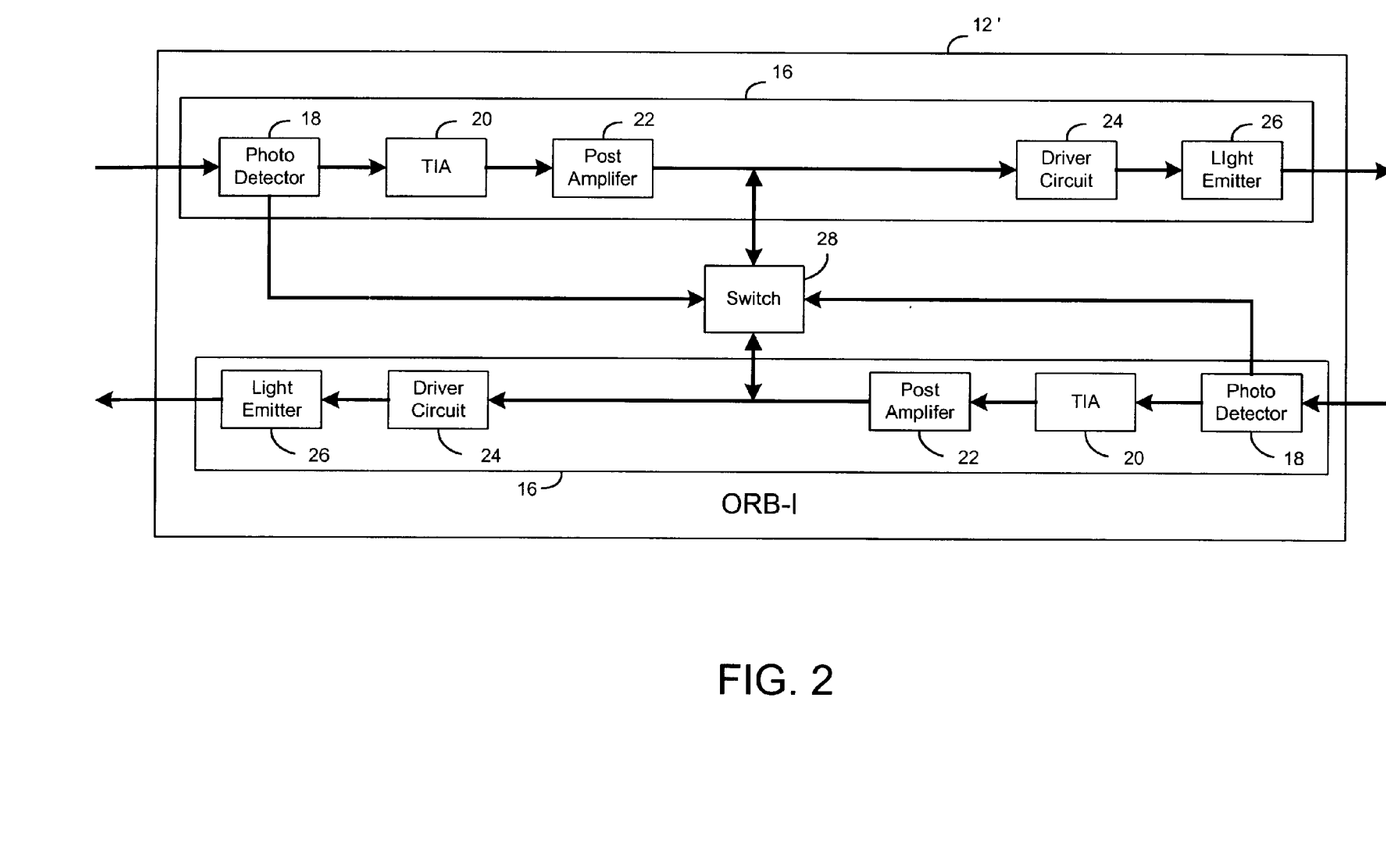
FIG. 2 is a schematic block diagram illustrating a basic version of the optical repeater block (ORB-I)
Figure 3:
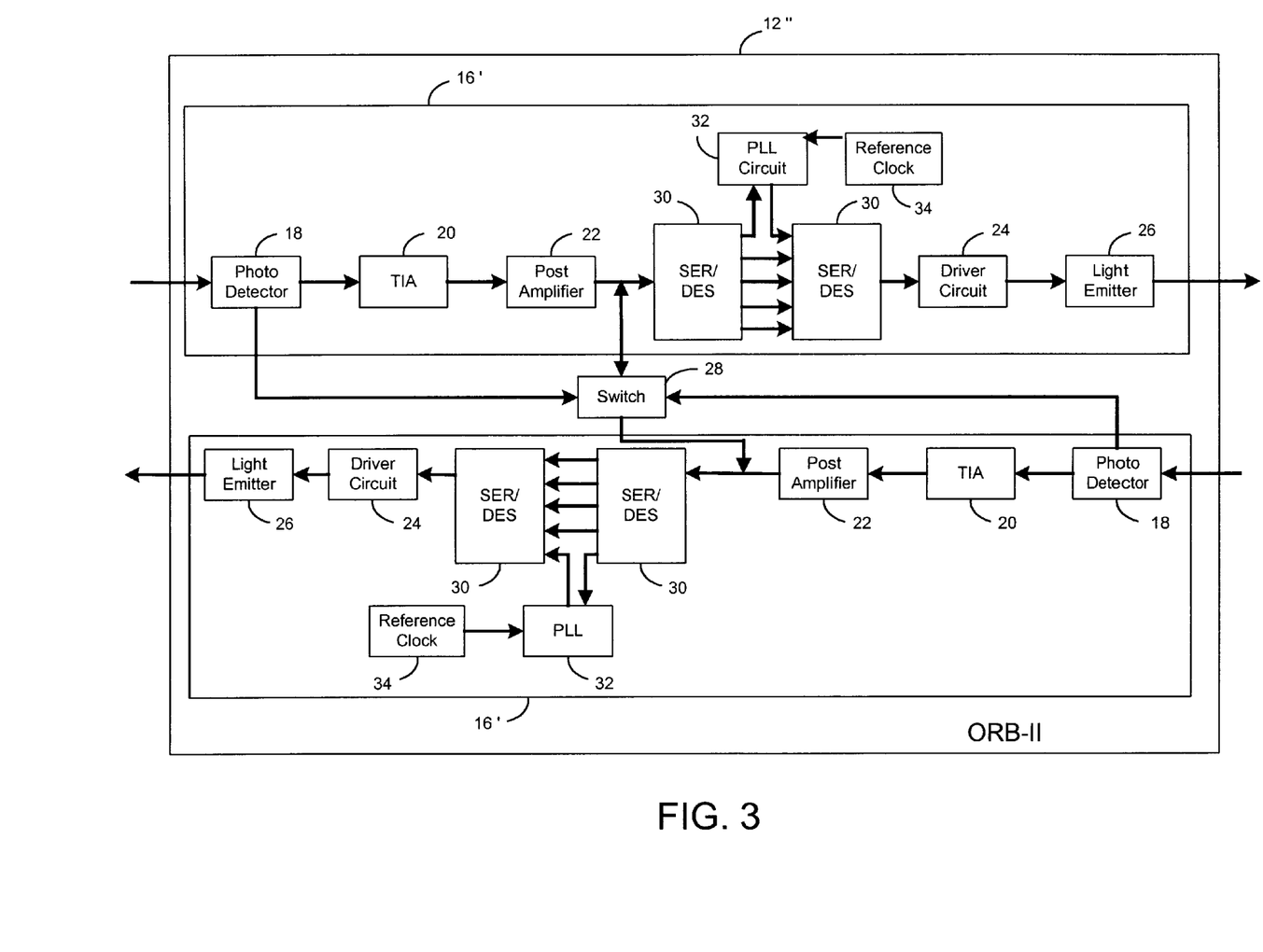
FIG. 3 is a schematic block diagram illustrating an enhanced version of the optical repeater block (ORB-II)
Figure 4:
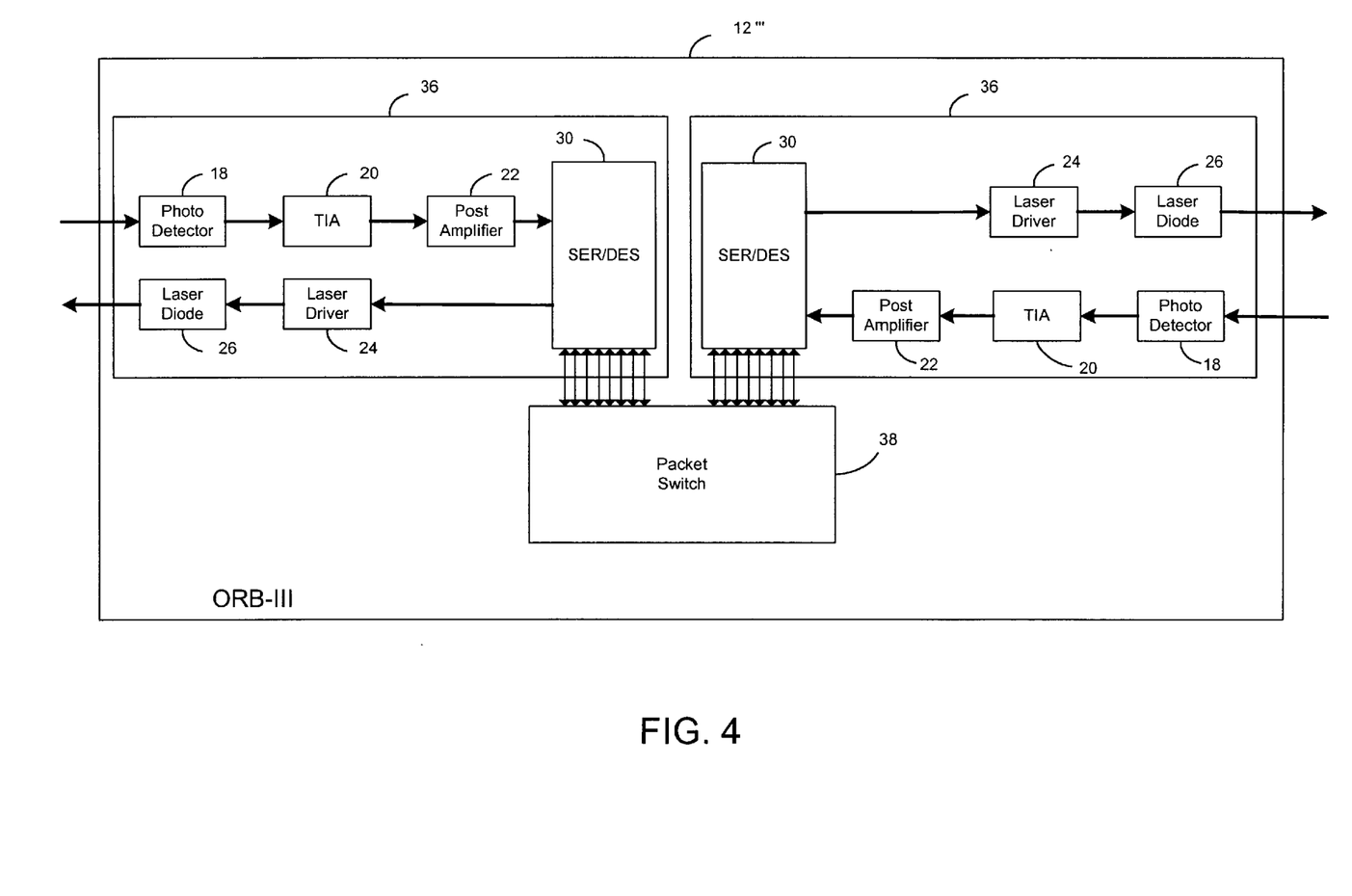
FIG. 4 is a schematic block diagram illustrating a further enhanced version of the optical repeater block (ORB-III)

Three exemplary versions of the ORB device 12 (i.e., ORB-I, ORB-II, and ORB-III) are depicted in FIGS. 2–4. All versions of the ORB device 12 have two signal paths that are identical to each other but process signals travelling in opposite directions or channels. In FIG. 2, a basic ORB device 12' is shown to include, in each channel, an optical repeater circuit 16 comprising a photo detector 18 for receiving free-space optical signals and generating an electrical signal representing the optical signal; a trans- impedence amplifier (TIA) 20 and a post amplifier 22 coupled to the photo detector 18 for boosting the level of the electrical signals, a driver circuit 24 coupled to the post amplifier 22 to convert the amplified electrical signals to a drive signal, and a light emitter (e.g., laser diode) 26 coupled to the driver circuit 24 to transmit an optical signal representing the drive signal. A switch 28 is coupled between the channels for reasons explained hereinafter. More specifically, the photo detector 18 is a transducer (e.g., photodiode or avalanche photodiode) that detects optical signals and produces electrical signals representing the same information in the optical signal. The TIA 20 and post amplifier 22 boost the intensity of electrical signals, which are then carried to the driver circuit 24 in order to drive the light emitter 26. The switch 28, which is coupled between optical repeater circuits at a point between an output of the post amplifier 22 in each optical repeater circuit 16 and the input to the driver circuit 24 in the other optical repeater circuit 16, allows an amplified electric signals to be looped back from one optical repeater circuit to the input of the driver circuit 24 of the other optical repeater circuit, if one of the photo detectors 18 fails to receive optical signals. In other words, the switch 28 is coupled to the photo detector 18 in each optical repeater circuit 16 to route the output of the amplifier in the event the corresponding photo detector fails to detect incoming free-space optical signals.

An enhanced version of the ORB device 12, called ORB-II 12", is shown in FIG. 3. Each optical repeater circuit 16" is similar to opticla repeater circuit 16' shown in FIG. 2 but further includes at least a pair of serializers/deserializers (SER/DES) 30, a phase lock loop circuit 32, and a reference clock 34. The first SER/DES 30 is coupled to the output of the post amplifier 22 for converting serial data to parallel data, and the second SER/DES 30 coupled to the output of the first SER/DES 30 and to the input of the driver circuit 24 for converting the parallel data back to serial data. The phase lock loop circuit 32 is couple between the parallel output of the first SER/DES 30 to synchronize the coupling of data into the second SER/DES 30 to re-time data carried by optical signals with respect to a reference clock signal from the reference clock 34. In other words, the phase-locked loop (PLL) 32, which maintains a constant phase relative to a reference signal from the reference clock 34, synchronizes the assembly and disassembly of packet of bits in the processing channel of each optical repeater device.

In an ORB-III 12''' as shown in FIG. 4, two Optical Interface Units (OIU) 36 are each integrated or coupled to a modular packet switch 38, and each OIU 36 includes a photo detector 18 to receive an incoming free-space optical signal and convert the optical signal to an electrical representative of the optical signal; a TIA 20 and post amplifier 22 to amplify the electrical signal; a SER/DES 30 coupled to the amplifier, the SER/DES 30 converting serial data output by the amplifier to parallel data and converting parallel data to serial data; a driver circuit 24 coupled to the SER/DES 30 to receive a serial data signal output by the SER/DES 30 and to generate a drive signal; and a light emitter coupled to the driver circuit to emit an optical signal based on the drive signal. In summary, the two OIUs are each coupled to an optical port, and each OIU detects an incoming free-space optical signal at the associated optical port and retransmits an outgoing free-space optical signal via the associated optical port.

The packet switch 38 has at least two input ports to interface parallel data to and from the SER/DES 30 in each optical interface unit 36. The packet switch 38 also performs media access control (MAC) layer address-based routing of packets of data received by the optical repeater device. One exemplary type of packet switch employs a system called transparent bridging to create address lookup tables. The transparent bridging, which has five distinct features (i.e., learning, flooding, filtering, forwarding, and aging), specifically allows the packet switch to learn everything it needs to know about the location of nodes on a network. Other types of packet switch may include, but not limited to, one or more of the following circuits: a transceiver circuit, media access control circuit, packet data access path circuit, packet data store device, packet switch engine circuit, queuing engine circuit, and media access control address table memory storage circuit.

Figure 5:
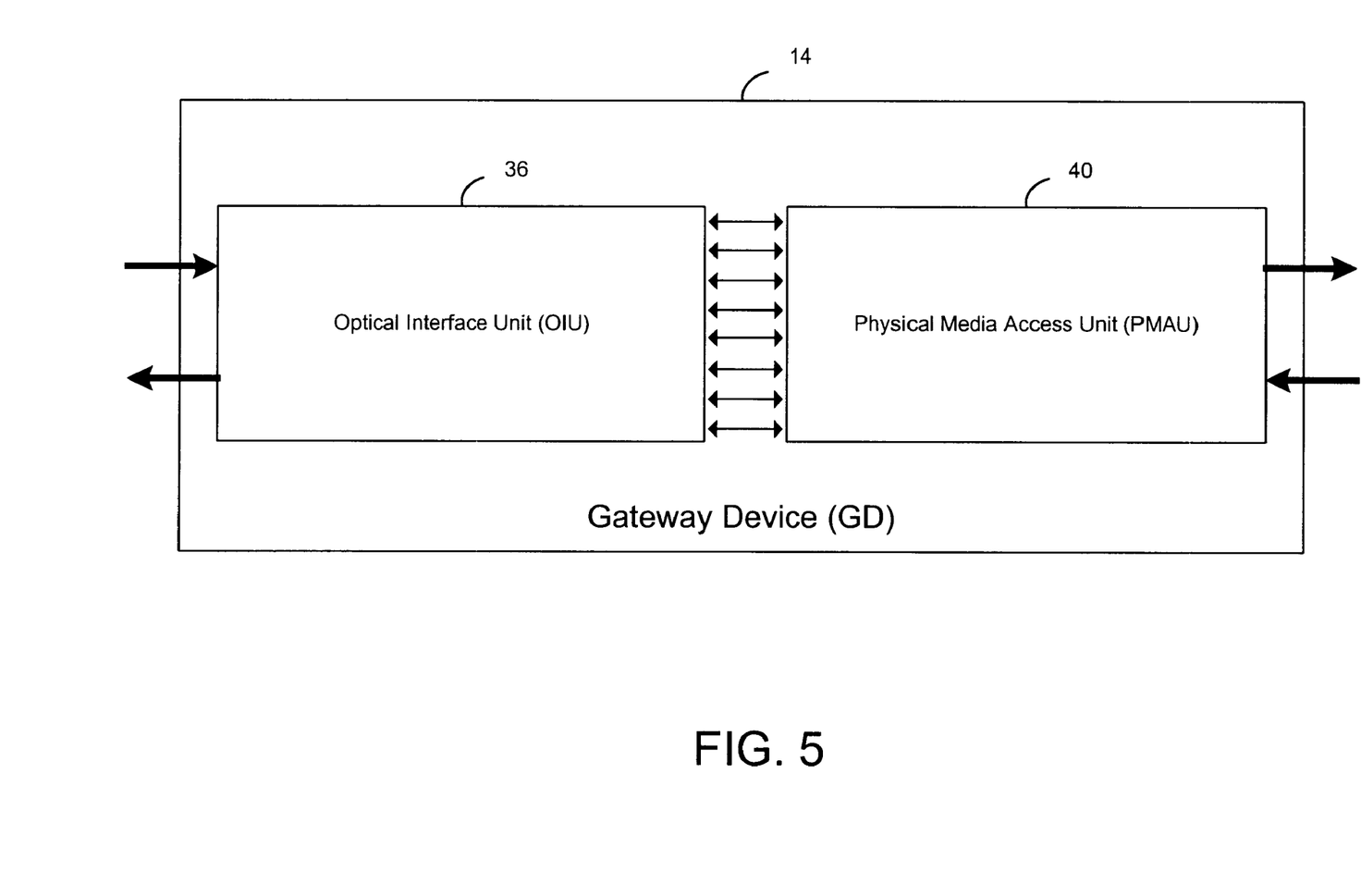
FIG. 5 is a schematic block diagram illustrating a customer premise equipment according to the present invention.

The GD 14 as shown in FIG. 5 is comprised of an Optical Interface Unit (OIU) 36 similar to that shown in FIG. 4, and a Physical Media Access Unit (PMAU) 40. The PMAU 40 is configured in accordance with the specific type of media or network interface to be communicated or coupled therewith. That is, the PMAU interfaces between electrical signals of the OIU 36 with signals of a particular physical media format, such as radio frequency, optical, or electrical media. Additionally, in one exemplary configuration, the OIU 36 transmits outgoing optical signals and receives incoming optical signals to and from the optical network, while the PMAU 40 is an electronic transceiver which converts electrical signals from the OIU 36 to a specific physical format as required by other servers or networks, such as the Wide Area Network (WAN) or Internet. Alternatively, a modular packet switch 38 can be provided in the GD 14 in a manner similar to that shown in FIG. 4.

Figure 6:
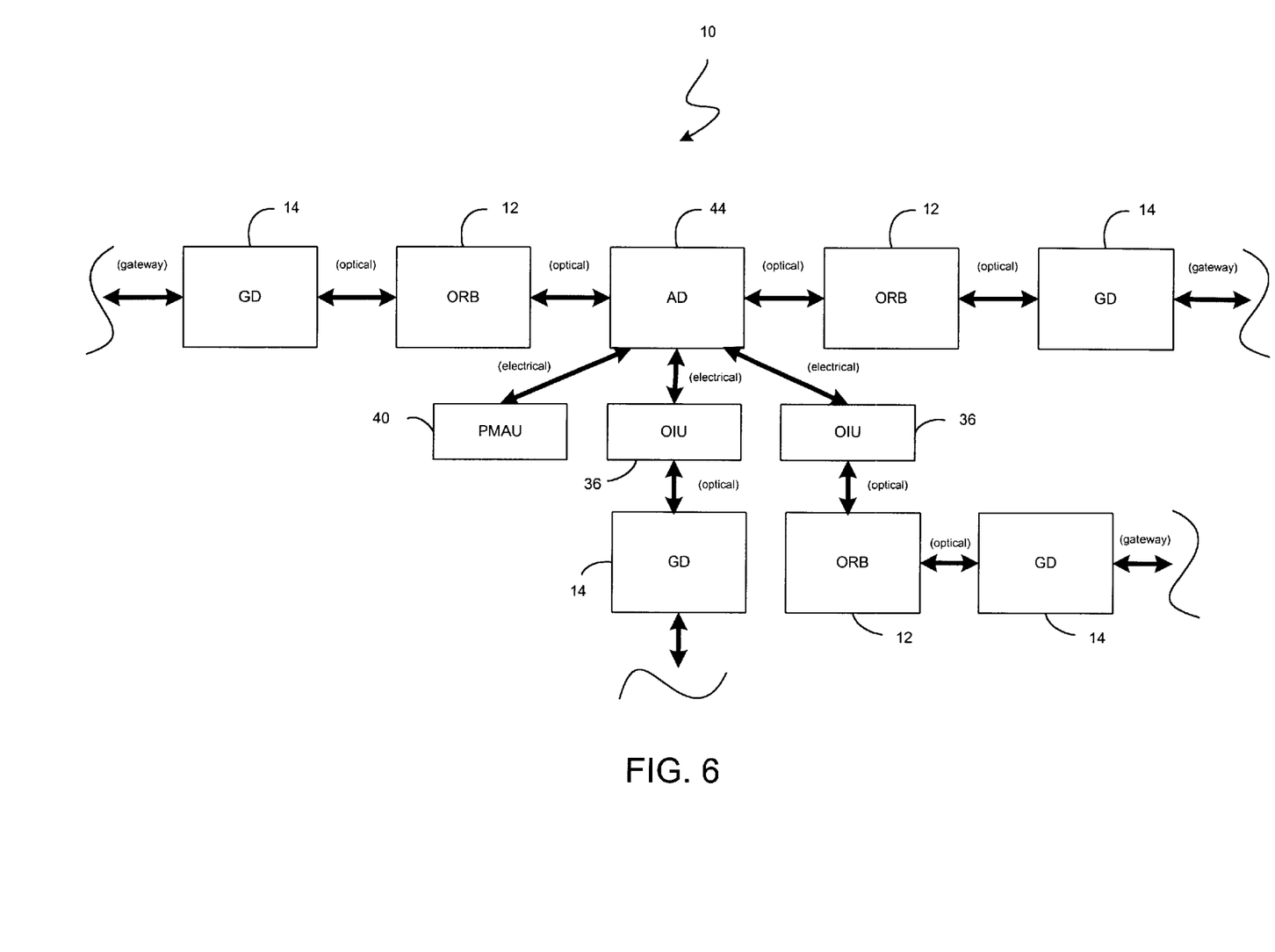
FIG. 6 is an expanded optical communication system according to the present invention.

FIG. 6 depicts an expanded (i.e., cascaded line-of-sight) optical communication system 40 for wirelessly transmitting and relaying optical signals across free space. As shown in FIG. 6, the GD 14 is used to serve as an intelligent connection device to a wired or wireless local area and/or wide area network such as the Internet. The GD 14 is capable of interpreting the International Standard Organization (ISO) Open System Interconnect Reference Model (OSI-RM) in Layer 2 (Data Link Layer) and Layer 3 (Network Layer) from a variety of physical or logical protocols. The optical signals transmitted from the GD 14 are then received by one of the ORB devices 12 of type I, II, or III (i.e., ORB-I, ORB-II, or ORB-III), which amplifies, re-directs or bends light in different directions.

Figure 7:
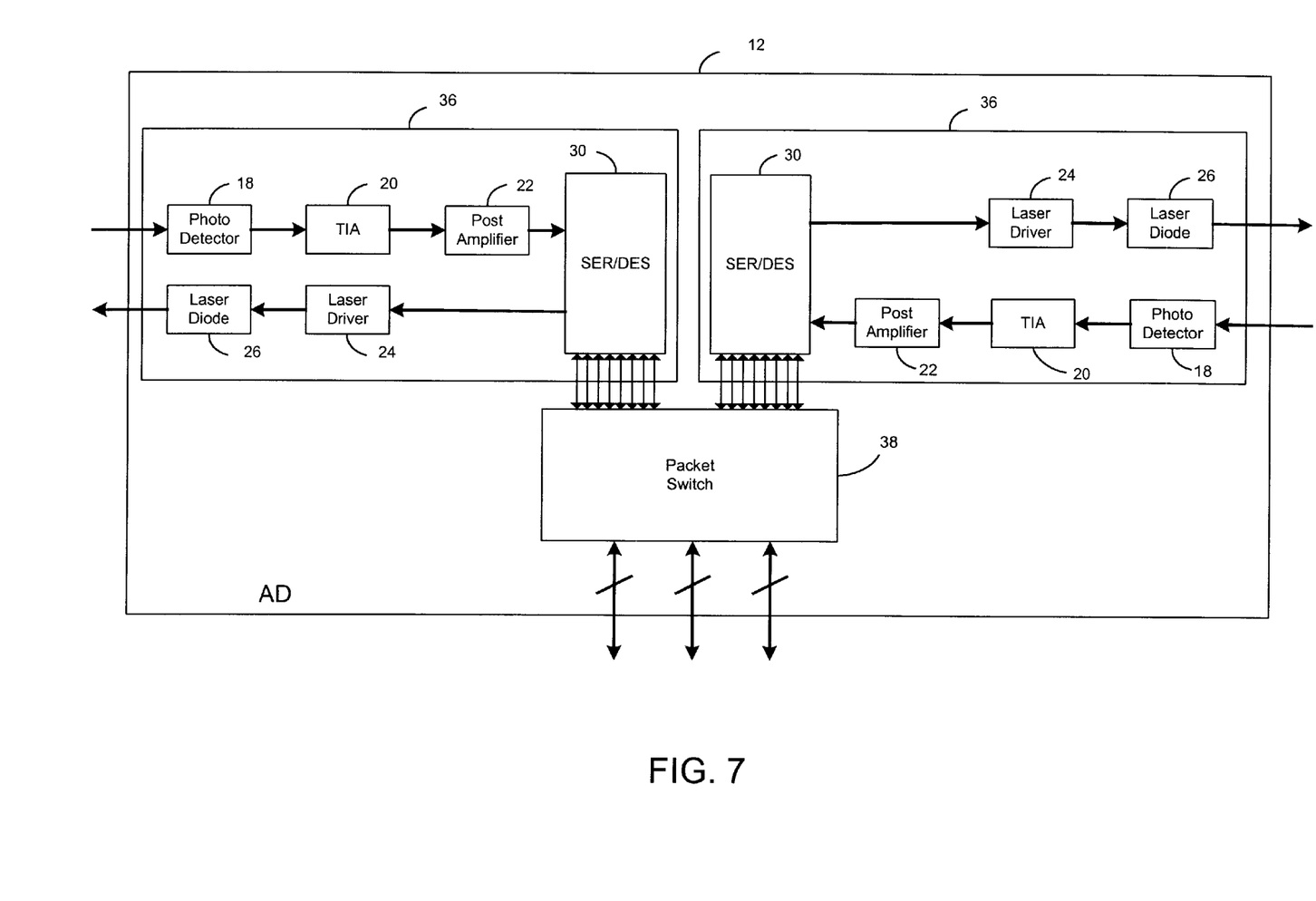
FIG. 7 is a schematic block diagram illustrating an access device according to the present invention.

More specifically, the AD 44 as shown in FIG. 7, receives and retransmits optical signals by reshaping, re-timing, and reconstructing corresponding digital signals converted therein. However, the AD 44 may also communicate with other devices such as the GD 14 or ORB device 12 by coupling, e.g., the OIU 36. For example, by coupling or integrating an optical transceiver to the AD 44, optical signals with data can be received from or supplied to the OIU 36. The packet switch has at least two input ports to interface parallel data to and from the SER/DES in each optical interface unit and at least one access port to interface parallel data to another device. Particularly, the packet switch performs media access control (MAC) layer address-based routing of packets of data received by the access device so as to route packets through the optical network and to and from devices coupled to the at least one access port.

From subscribers'perspective, the AD 44 is an on-ramp or exit-ramp for data traffic to enter or exit optical communications network of the present invention. The GD 14 or PMAU 40 provides an access point for subscribers and serves as the demarcation point of service. However, it does not include terminals and associated equipment and inside wiring located at subscribers'premises.

By adding magnets (not shown) to both the ORB device 12 and GD 14, a customer's premise can have both the ORB device 12 and GD 14 non-intrusively installed therein. For instance, by allowing the GD 14 of an optical type and the ORB device 14 to face each other through a clear window, magnets installed therein would provide structure, data and power support thereto.

Figure 8A:
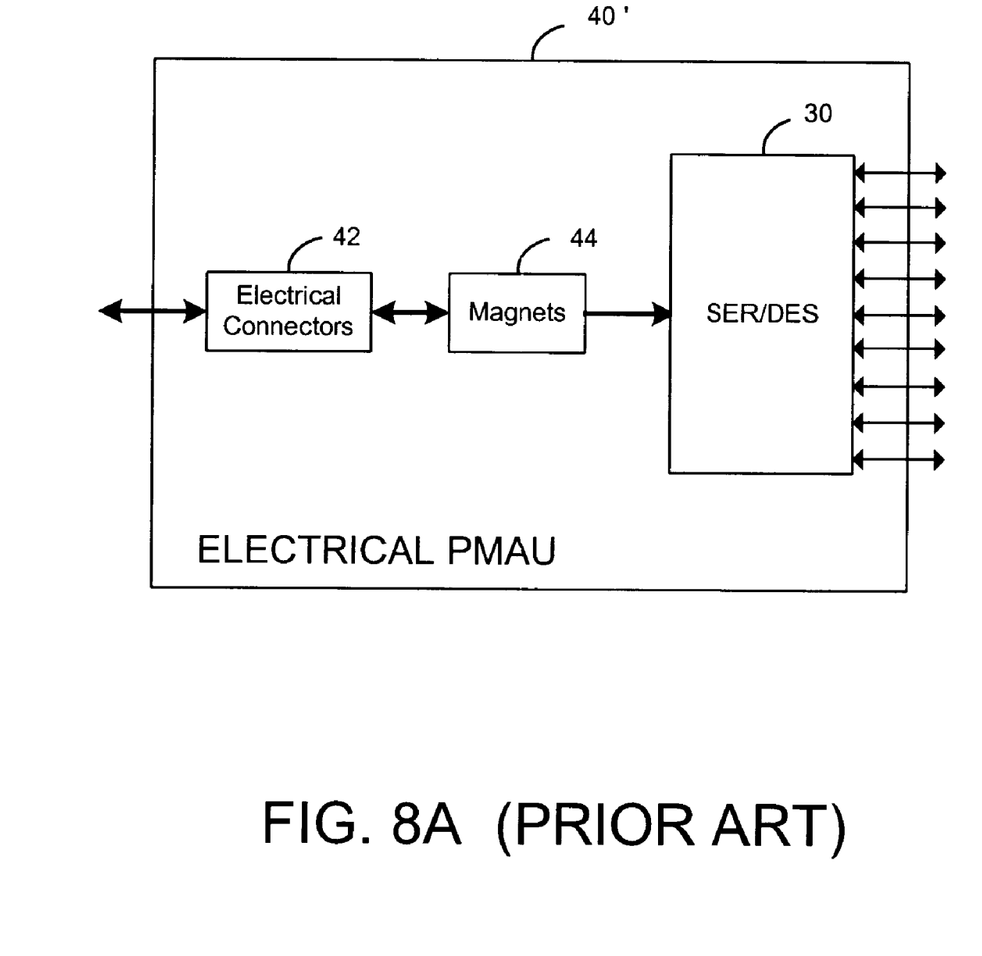
FIG. 8A is a schematic block diagram illustrating a conventional electrical physical media access unit.
Figure 8B:
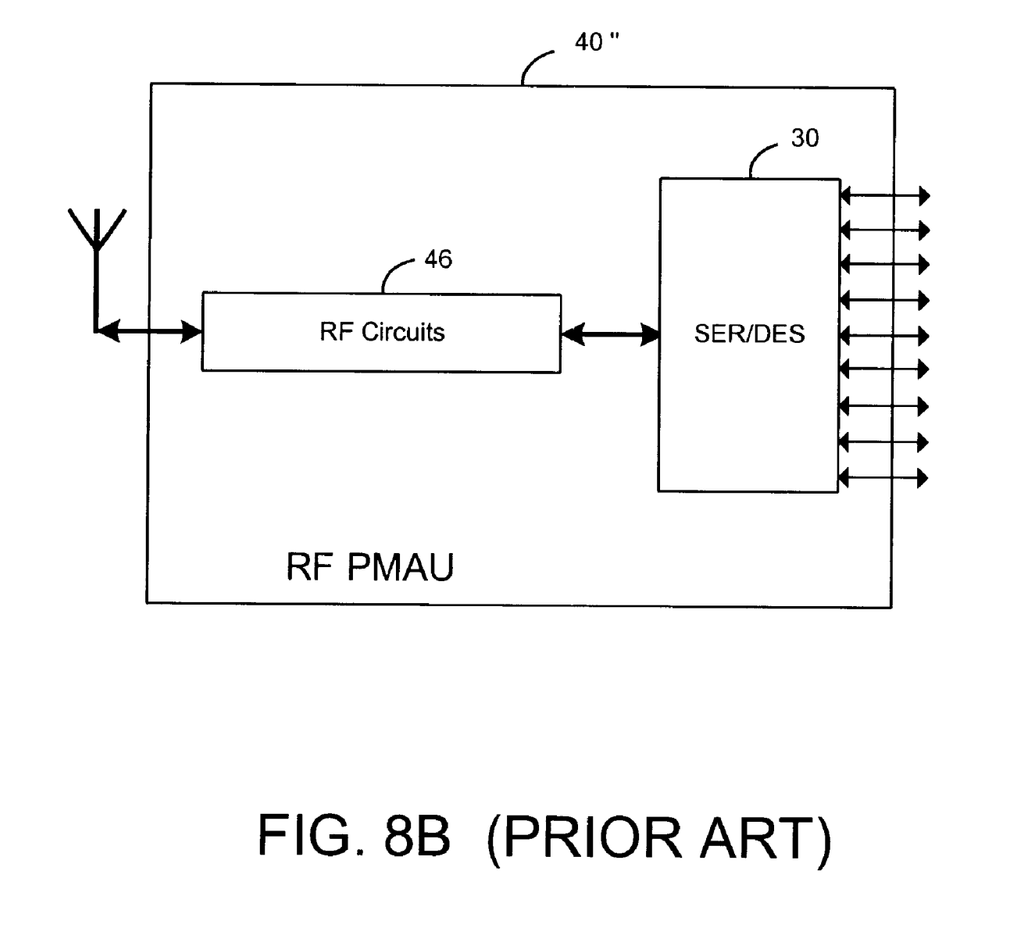
FIG. 8B is a schematic block diagram illustrating a conventional RF physical media access unit.

Exemplary types of conventional PMAUs are shown in FIGS. 8A and 8B. FIG. 8A shows an electrical PMAU 40' which typically includes electrical connectors 42 surrounded and driven by magnets 44, and a SER/DES 30 to convert serial data to parallel data and vice versa. FIG. 8B shows a wireless access point device 40" consisted of an RF PMAU 46, which may implement any wireless communication protocol such as IEEE 802.11B or Bluetooth™.

Figure 9:
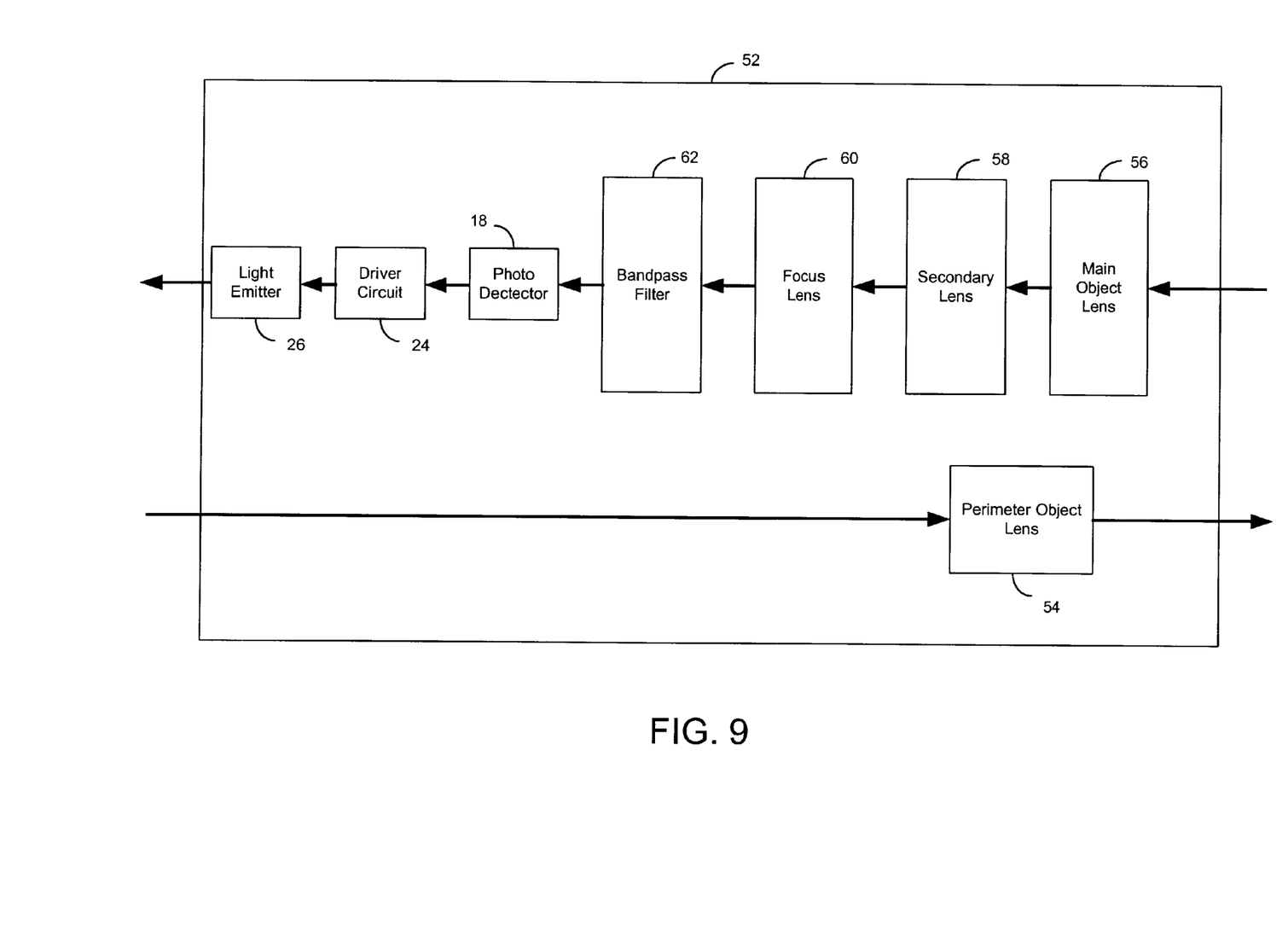
FIG. 9 is a schematic block diagram showing a basic optical lens unit according to the present invention.

FIG. 9 illustrates a basic optical lens system 52 which can be used at the optical port of an ORB device for enhanced light detection and transmission. The optical lens system 52 has a perimeter focus lens 54 to receive focus received light passing therethrough. Additionally, the optical lens system 52 has an incoming lens assembly which includes main object lens 56 to receive incident light from, e.g. an ORB device 12, and a secondary lens 58 and a focus lens 60 to focus the light passing therethrough. The wavelength of the light is subsequently processed by a wavelength bandpass filter 62. The optical signals are then detected by a photo detector 18 (e.g., an avalanche photo diode) and converted to electrical signals. The electrical signals are converted back to optical signals by a light emitter (e.g., laser diode or vertical cavity surface emitter laser (VSCEL)) 26 which is driven by a driver circuit 24, and outputted to another ORB device 12.

Figure 10:
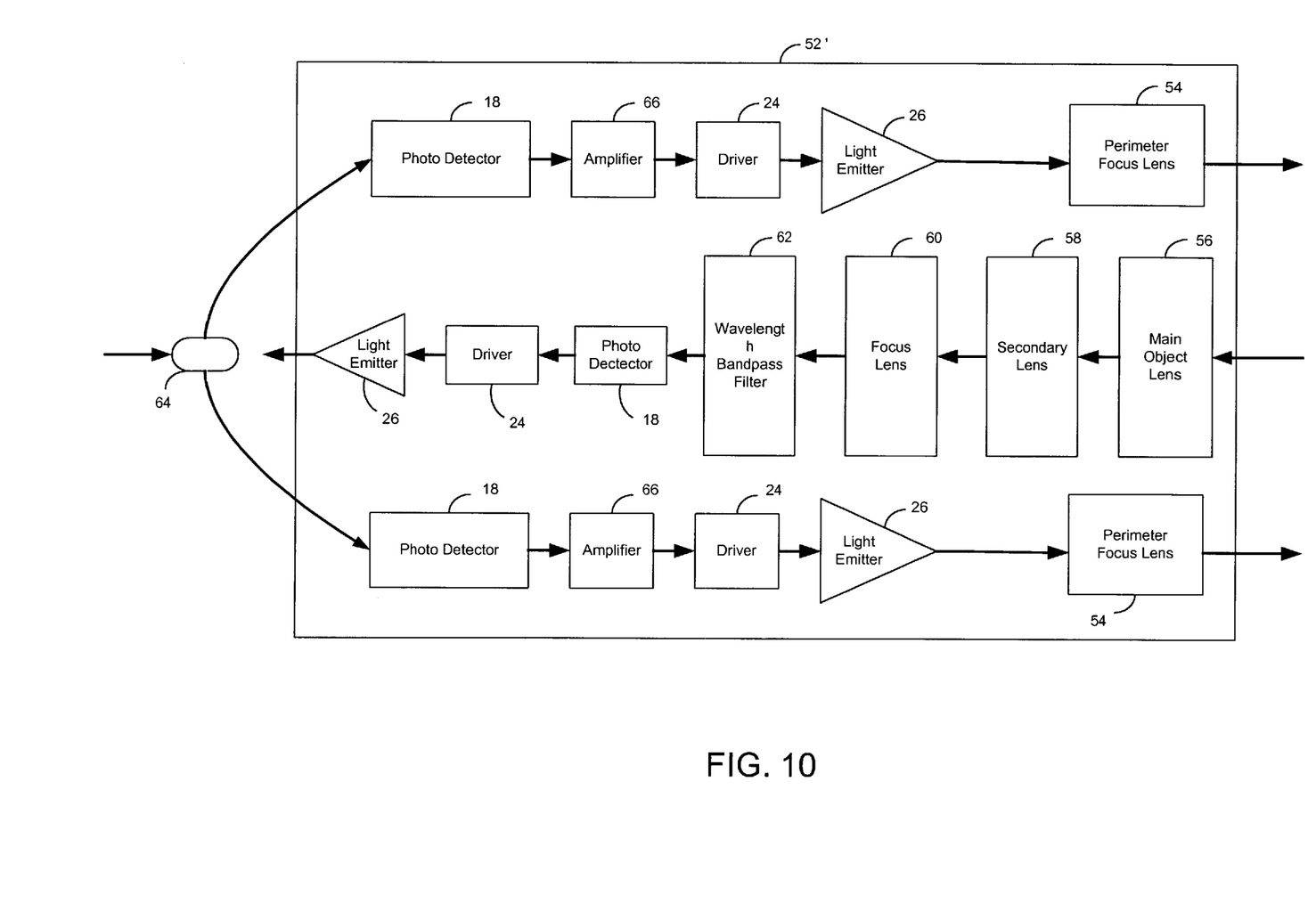
FIG. 10 a schematic block diagram illustrating an enhanced optical lens unit according to the present invention.

FIG. 10 shows an enhanced optical lens system 52' with two or more light emitting channels. The optical lens system 52' also has a photo detector 18 in each channel for receiving optical signals from, e.g., an ORB device 12 via, e.g., a fiber splitter 64. The received optical signals are converted into electrical signals and amplified by an amplifier 66. One or more light emitters (e.g., laser diode or vertical cavity surface emitter lasers (VSCEL)) 26 generate coherent light for outputting optical signals through each of the perimeter object lenses 54. In addition to the main object lens 56, the optical lens system 52' also has a secondary lens 56 for receiving incident light, which is then focused by a focus lens 58 and filtered through a wavelength bandpass filter 60. The optical signals are then detected by another photo detector 62 (e.g., an avalanche photo diode) and converted to electrical signals. The electrical signals are converted to optical signals by another light emitter 64, which is driven by a driver 62, and outputted an ORB device 12.

In other words, the enhanced optical lens system 52' has an incoming lens assembly for receiving and focusing a plurality incoming optical beams. The incoming lens assembly has the main object lens 56 and one or more additional lenses, the photo detector 18 to detect light focused by the incoming lens assembly and generating at least one electrical signal representative thereof. The enhanced optical lens system 52' also has an outgoing lens assembly, which has the beam splitter 64 to split an outgoing optical beam into a plurality of identical beams, the photo detectors 18 each for detecting one of the plurality of identical beams and generating an electrical signal representative thereof, the amplifiers 66 each associated with a photo detector in the outgoing lens assembly to amplify the electrical signal output by the photo detector 18, the driver circuits 26 respectively corresponding to the amplifiers 66 for generating a drive signal for each amplified electrical signal, the light emitters respectively corresponding to amplifiers 66 for generating an optical beam based on the drive signal, and the object lens respectively corresponding to light emitters 26 to focus an optical beam radiated thereby for free-space transmission.

The infrastructure for the above-discussed communication system 10 of the present invention can be constructed by arranging each of optical devices in a line-of-sight and cascaded manner. A large volume of data can be optically transported among towns in free-space at a high rate of speed, thus providing true broadband services at a relatively low cost per subscriber. This type of infrastructure is compatible with and complementary to the existing communications network such as the Internet, SONET, etc.

Accordingly, it can be seen that the system of the present invention and its various embodiments are fully capable of achieving the above-mentioned aspects and advantages of the present invention, although not every embodiment need meet every object and advantage.

Obviously, numerous modifications and variations of the present invention are possible in light of the above teachings. It is therefore to be understood that the above exemplary embodiments are shown merely for the purpose of illustration and not for the purpose of limitation. Indeed, within the scope of the appended claims, many other modifications and variations will be ascertainable to those of skill in the art. The drawings are also to be regarded in an illustrative rather than in a restrictive sense. It will, however, be evident that various modification and changes may be made thereto without departing from the broader spirit and scope of the invention as set forth in the claims.

What is claimed is:

1. A communication system comprising:
   a free-space optical network comprising at least two optical repeater devices coupled to each other and at least one gateway device coupled to one of the optical repeater devices and comprising an optical interface unit that interfaces free-space optical signals of the free-space optical network with electrical signals,
   wherein each optical repeater device has at least two optical ports and two optical repeater circuits coupled between each optical port, each optical repeater circuit detects an incoming free-space optical signal at one optical port and retransmits an outgoing free-space optical signal,
   wherein each optical repeater circuit in said optical repeater device comprises a photo detector for receiving free-space optical signals and generating an electrical signal representing the optical signal; an amplifier coupled to the photo detector for boosting a level of said electrical signal; a driver circuit coupled to the amplifier to convert the amplified electrical signal to a drive signal, and a light emitter coupled to the driver circuit to transmit an optical signal representing the drive signal, and
   wherein each of said optical repeater devices further comprises a switch coupled between optical repeater circuits at a point between an output of the amplifier in each optical repeater circuit and the input to the driver circuit in the other optical repeater circuit in order to couple an amplified electrical signal from one optical repeater circuit to the input of the driver circuit of the other optical repeater circuit.

2. The system of claim 1, wherein the switch is coupled to the photo detector in each optical repeater circuit to route the output of the amplifier in that optical repeater circuit in the event the corresponding photo detector fails to detect incoming free-space optical signals.

3. A communication system comprising:
   a free-space optical network comprising at least two optical repeater devices coupled to each other and at least one gateway device coupled to one of the optical repeater devices and comprising an optical interface unit that interfaces free-space optical signals of the free-space optical network with electrical signals,
   wherein each optical repeater device has at least two optical ports and two optical repeater circuits coupled between each optical port, each optical repeater circuit detects an incoming free-space optical signal at one optical port and retransmits an outgoing free-space optical signal,
   wherein each optical repeater circuit in said optical repeater device comprises a photo detector for receiving free-space optical signals and generating an electrical signal representing the optical signal; an amplifier coupled to the photo detector for boosting a level of said electrical signal; a driver circuit coupled to the amplifier to convert the amplified electrical signal to a drive signal; and a light emitter coupled to the driver circuit to transmit an optical signal representing the drive signal, and
   wherein each optical repeater circuit in at least one optical repeater device further comprises first and second serializer/deserializers (SER/DES) and a phase lock loop circuit, the first SER/DES coupled to the output of the amplifier to convert serial data to parallel data, the second SER/DES coupled to the output of the first SER/DES to convert the parallel data back to serial data which is coupled to the input of the driver circuit, wherein the phase lock loop circuit is coupled between the parallel output of the first SER/DES to synchronize the coupling of data into the second SER/DES to re-time data carried by optical signals with respect to a reference clock signal.

4. A communication system comprising:
   a free-space optical network comprising at least two optical repeater devices coupled to each other and at least one gateway device coupled to one of the optical repeater devices and comprising an optical interface unit that interfaces free-space optical signals of the free-space optical network with electrical signals,
   wherein each optical repeater device has at least two optical ports and two optical repeater circuits coupled between each optical port, each optical repeater circuit detects an incoming free-space optical signal at one optical port and retransmits an outgoing free-space optical signal, and
   an access device coupled to an optical repeater device, the access device serving as a distribution/aggregation point with respect to the optical network, wherein the access device comprises two optical ports, a packet switch, and two optical interface units each coupled to an optical port, each optical interface unit detects an incoming free-space optical signal at the associated optical port and retransmits an outgoing free-space optical signal via the associated optical port, each optical interface unit comprising:
   a photo detector to receive an incoming free-space optical signal and convert the optical signal to an electrical signal representative of the optical signal;
   an amplifier coupled to the photo detector to amplify the electrical signal;
   a serializer/deserializer (SER/DES) coupled to the amplifier, the SER/DES converting serial data output by the amplifier to parallel data and converting parallel data to serial data;

a driver circuit coupled to the SER/DES to receive a serial data signal output by the SER/DES and to generate a drive signal; and a light emitter coupled to the driver circuit to emit an optical signal based on the drive signal, wherein the packet switch has at least two input ports to interface parallel data to and from the SER/DES in each optical interface unit and at least one access port to interface parallel data to another device, wherein the packet switch performs media access control (MAC) layer address-based routing of packets of data received by the access device so as to route packets through the optical network and to and from devices coupled to the at least one access port.

5. A communication system comprising:

a free-space optical network comprising at least two optical repeater devices coupled to each other and at least one gateway device coupled to one of the optical repeater devices and comprising an optical interface unit that interfaces free-space optical signals of the free-space optical network with electrical signals, each optical repeater device having two optical ports and detecting an incoming free-space optical signal at one port and retransmits an outgoing free-space optical signal;

at least one optical repeater device in the free-space optical network comprising two optical interface units each coupled to an optical port and a packet switch, each optical interface unit detects an incoming free-space optical signal at the associated optical port and retransmits an outgoing free-space optical signal via the associated optical port, each optical interface unit comprising:

a photo detector to receive an incoming free-space optical signal and convert it to an electrical signal representative of the optical signal;

an amplifier coupled to the photo detector to amplify the electrical signal;

a serializer/deserializer (SER/DES) coupled to the amplifier, the SER/DES converting serial data output by the amplifier to parallel data and converting parallel data to serial data;

a driver circuit coupled to the SER/DES to receive a serial data signal output by the SER/DES and to generate a drive signal;

a light emitter coupled to the driver circuit to emit an optical signal based on the drive signal; and wherein the packet switch has at least two input ports to interface parallel data to and from the SER/DES in each optical interface unit, and wherein the packet switch performs media access control (MAC) layer address-based routing of packets of data received by the optical repeater device.

6. The system of claim 5, wherein the gateway device further comprises a physical media access unit that interfaces between electrical signals of the optical interface unit with signals of a particular physical media format.

7. The system of claim 6, wherein the physical media access unit of the gateway device interfaces electrical signals of the optical interface unit with signals of at least one or more physical media types selected from the group consisting of radio frequency, optical, and electrical.

8. An optical repeater device for use in a free-space optical network for transmitting and receiving free-space optical signals, the optical repeater device comprising:

at least two optical ports, each optical port for receiving an incoming free-space optical signal and transmitting an outgoing optical signal; and at least two optical repeater circuits coupled between each optical port, each optical repeater circuit detects the incoming free-space optical signal at one optical port and retransmits an outgoing free-optical signal, each optical repeater circuit comprising:

a photo detector for receiving free-space optical signals and generating an electrical signal representing the optical signal;

an amplifier coupled to the photo detector for boosting a level of said electrical signal;

a driver circuit coupled to the amplifier to convert the amplified electrical signal to a drive signal;

a light emitter coupled to the driver circuit to transmit an optical signal representing the drive signal, and a switch coupled between optical repeater circuits at a point between an output of the amplifier in each optical repeater circuit and the input to the driver circuit in the other optical repeater circuit in order to couple an amplified electrical signal from one optical repeater circuit to the input of the driver circuit of the other optical repeater circuit.

9. The optical repeater device of claim 8, wherein the switch is coupled to the photo detector in each optical repeater circuit to route the output of the amplifier in that optical repeater circuit in the event the corresponding photo detector fails to detect incoming free-space optical signals.

10. An optical repeater device for use in a free-space optical network for transmitting and receiving free-space optical signals, the optical repeater device comprising:

at least two optical ports, each optical port for receiving an incoming free-space optical signal and transmitting an outgoing optical signal; and at least two optical repeater circuits coupled between each optical port, each optical repeater circuit detects the incoming free-space optical signal at one optical port and retransmits an outgoing free-optical signal, each optical repeater circuit comprising:

a photo detector for receiving free-space optical signals and generating an electrical signal representing the optical signal;

an amplifier coupled to the photo detector for boosting a level of said electrical signal;

a driver circuit coupled to the amplifier to convert the amplified electrical signal to a drive signal;

a light emitter coupled to the driver circuit to transmit an optical signal representing the drive signal, wherein each optical repeater circuit further comprises first and second serializer/deserializers (SER/DES) and a phase lock loop circuit, the first SER/DES coupled to the output of the amplifier to convert serial data to parallel data, the second SER/DES coupled to the output of the first SER/DES to convert the parallel data back to serial data which is coupled to the input of the driver circuit, wherein the phase lock loop circuit is coupled between the parallel output of the first SER/DES to synchronize the coupling of data into the second SER/DES to re-time data carried by optical signals with respect to a reference clock signal.

11. An optical repeater device for use in a free-space optical network for transmitting and receiving free-space optical signals, the optical repeater device comprising:

at least two optical ports, each optical port for receiving an incoming free-space optical signal and transmitting an outgoing optical signal; and at least two optical repeater circuits coupled between each optical port, each optical repeater circuit detects the incoming free-space optical signal at one optical port and retransmits an outgoing free-optical signal, each optical repeater circuit comprising:
- a photo detector for receiving free-space optical signals and generating an electrical signal representing the optical signal;
- an amplifier coupled to the photo detector for boosting a level of said electrical signal;
- a driver circuit coupled to the amplifier to convert the amplified electrical signal to a drive signal;
- a light emitter coupled to the driver circuit to transmit an optical signal representing the drive signal,
- wherein at each optical port, further comprising an optical lens system, the optical lens system comprising:
  - an incoming lens assembly for receiving and focusing a plurality incoming optical beams, the incoming lens assembly comprising a main object lens and one or more additional lenses;
  - a photo detector to detect light focused by the incoming lens assembly and generating at least one electrical signal representative thereof; and
  - an outgoing lens assembly comprising:
    - a beam splitter to split an outgoing optical beam into a plurality of identical beams,
    - a plurality of photo detectors each for detecting one of the plurality of identical beams and generate an electrical signal representative thereof;
    - a plurality of amplifiers each associated with a photo detector in the outgoing lens assembly to amplify the electrical signal output by a photo detector;
    - a plurality of driver circuits each associated with an amplifier to generate a drive signal for each amplified electrical signal;
    - a plurality of light emitters each associated with an amplifier to generate an optical beam based on the drive signal; and
    - a plurality of object lens each associated with a light emitter to focus an optical beam radiated thereby for free-space transmission.

12. An optical repeater device for use in a free-space optical network for transmitting and receiving free-space optical signals, the optical repeater device comprising:
  two optical ports, two optical interface units each coupled to an optical port, and a packet switch, each optical interface unit detects an incoming free-space optical signal at the associated optical port and retransmits an outgoing free-space optical signal via the associated optical port, each optical interface unit comprising:
  - a photo detector to receive an incoming free-space optical signal and convert it to an electrical signal representative of the optical signal;
  - an amplifier coupled to the photo detector to amplify the electrical signal;
  - a serializer/deserializer (SER/DES) coupled to the amplifier, the SER/DES converting serial data output by the amplifier to parallel data and converting parallel data to serial data;
  - a driver circuit coupled to the SER/DES to receive a serial data signal output by the SER/DES and to generate a drive signal;
  - a light emitter coupled to the driver circuit to emit an optical signal based on the drive signal; and
  - wherein the packet switch has at least two input ports to interface parallel data to and from the SER/DES in each optical interface unit, and wherein the packet switch performs media access control (MAC) layer address-based routing of packets of data received by the optical repeater device.

13. The optical repeater device of claim 12, wherein at each optical port, further comprising an optical lens system, the optical lens system comprising:
  - an incoming lens assembly for receiving and focusing a plurality incoming optical beams, the incoming lens assembly comprising a main object lens and one or more additional lenses;
  - a photo detector to detect light focused by the incoming lens assembly and generating at least one electrical signal representative thereof;
  - an outgoing lens assembly comprising:
    - a beam splitter to split an outgoing optical beam into a plurality of identical beams,
    - a plurality of photo detectors each for detecting one of the plurality of identical beams and generating an electrical signal representative thereof;
    - a plurality of amplifiers each associated with a photo detector in the outgoing lens assembly to amplify the electrical signal output by a photo detector;
    - a plurality of driver circuits each associated with an amplifier to generate a drive signal for each amplified electrical signal;
    - a plurality of light emitters each associated with an amplifier to generate an optical beam based on the drive signal;
    - a plurality of object lens each associated with a light emitter to focus an optical beam radiated thereby for free-space transmission.

* * * * *